US009460042B2

(12) United States Patent
Iskandar et al.

(10) Patent No.: US 9,460,042 B2
(45) Date of Patent: Oct. 4, 2016

(54) BACKPLANE CONTROLLER TO ARBITRATE MULTIPLEXING OF COMMUNICATION (71) Applicant: Hewlett-Packard Development Company, L.P., Houston, TX (US)

(72) Inventors: Yovita Iskandar, Houston, TX (US); Patrick A. Raymond, Houston, TX (US); Hahn Norden, Houston, TX (US); Ryan Dennis Brooks, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 449 days.

(21) Appl. No.: 14/016,413

(22) Filed: Sep. 3, 2013

(65) Prior Publication Data

US 2015/0067226 A1 Mar. 5, 2015

(51) Int. Cl.
*G06F 3/00* (2006.01)
*G06F 13/40* (2006.01)
*G06F 13/00* (2006.01)

(52) U.S. Cl.
CPC .................. *G06F 13/4031* (2013.01)

(58) Field of Classification Search
CPC .................. G06F 3/00; G06F 13/00
USPC .......... 710/51, 36–38, 300; 711/111
See application file for complete search history.

(56) References Cited

U.S. PATENT DOCUMENTS

| | | | |
|---|---|---|---|
| 6,487,680 B1 * | 11/2002 | Skazinski et al. | 714/23 |
| 6,839,488 B2 * | 1/2005 | Gunn, III | 385/40 |
| 6,862,668 B2 * | 3/2005 | McKean et al. | 711/154 |
| 7,127,558 B2 * | 10/2006 | Honda et al. | 711/114 |
| 7,190,190 B1 | 3/2007 | Camarota et al. | |
| 7,676,614 B2 * | 3/2010 | Chou et al. | 710/74 |
| 7,685,329 B1 * | 3/2010 | Sivertsen | 710/15 |
| 7,996,608 B1 * | 8/2011 | Chatterjee et al. | 711/114 |
| 8,010,829 B1 * | 8/2011 | Chatterjee et al. | 714/4.11 |
| 8,055,938 B1 * | 11/2011 | Chatterjee et al. | 714/6.24 |
| 8,443,114 B2 * | 5/2013 | Lambert et al. | 710/13 |
| 8,583,847 B2 * | 11/2013 | Paul et al. | 710/304 |
| 8,799,549 B2 * | 8/2014 | Huang et al. | 710/313 |
| 8,938,566 B2 * | 1/2015 | Dhandapani et al. | 710/300 |
| 2007/0067552 A1 | 3/2007 | Toporski | |
| 2009/0119420 A1 | 5/2009 | Morrell | |
| 2011/0113179 A1 | 5/2011 | Cartes et al. | |
| 2012/0311211 A1 | 12/2012 | Gao | |

OTHER PUBLICATIONS i.MX 6Dual/6Quad Applications Processors for Industrial Products, Freescale Semiconductor Data Sheet: Technical Data, Document No. IMX6DQIEC, Rev. 1, Nov. 2012, pp. 1-167, Freescale Semiconductor, Inc., Available at: <cache.freescale.com/files/32bit/doc/data_sheet/IMX6DQIEC.pdf>.

* cited by examiner

*Primary Examiner* — Christopher Shin
(74) *Attorney, Agent, or Firm* — Hewlett Packard Enterprise Patent Department (57) ABSTRACT A backplane controller to couple to a carrier interface and a plurality of host controllers of different types. The backplane controller is to identify a host controller corresponding to a type of a storage device of a storage device carrier. The storage device carrier is to interface with the carrier interface. The backplane controller is to arbitrate multiplexing of communication between the carrier interface and the identified host controller.

15 Claims, 6 Drawing Sheets

BACKPLANE CONTROLLER TO ARBITRATE MULTIPLEXING OF COMMUNICATION

BACKGROUND

A backplane may enable communications between a host (e.g., a storage device controller) and a storage device. The backplane may use a type of controller and connector corresponding to a type of storage device, resulting in incompatibilities when different types of storage devices are involved.

DETAILED DESCRIPTION

Examples described herein include a backplane controller to interface different types of storage devices and host controllers. In an example, a backplane controller may multiplex communication between a plurality of different types of host controllers to support functions of storage device carriers for different types of storage devices. The backplane controller may reside in a backplane, and the selection of communication pathways may be based on a type of storage device (e.g., hard drive) being interfaced. The host controllers may be adaptable to accommodate future technologies. In addition to the multiplexing communication, the backplane controller also may send commands to the storage devices and storage device carriers, including reset, hot-plug, and hot-removal commands using existing multiplexed communication channels.

Thus, examples provided herein may provide a secure and orderly environment for various storage solutions, including support for storage devices based on small computer system interface (SCSI) express, serial attached SCSI (SAS), peripheral component interconnect (PCI) express, and others. A carrier interface may be based on a standardized bay to receive a drive carrier, regardless of the type of storage device in the storage device carrier (SCSI express, SAS, PCI express, or future technology. A single backplane controller may be used to perform multiple functions, reducing board complexity and allowing future addition of features. A design of the storage device carrier may remain unchanged or minimally changed across different applications, while enabling support for SAS and/or serial advance technology attachment (SATA), SCSI express, PCI express, and other types of storage devices.

Figure 1:
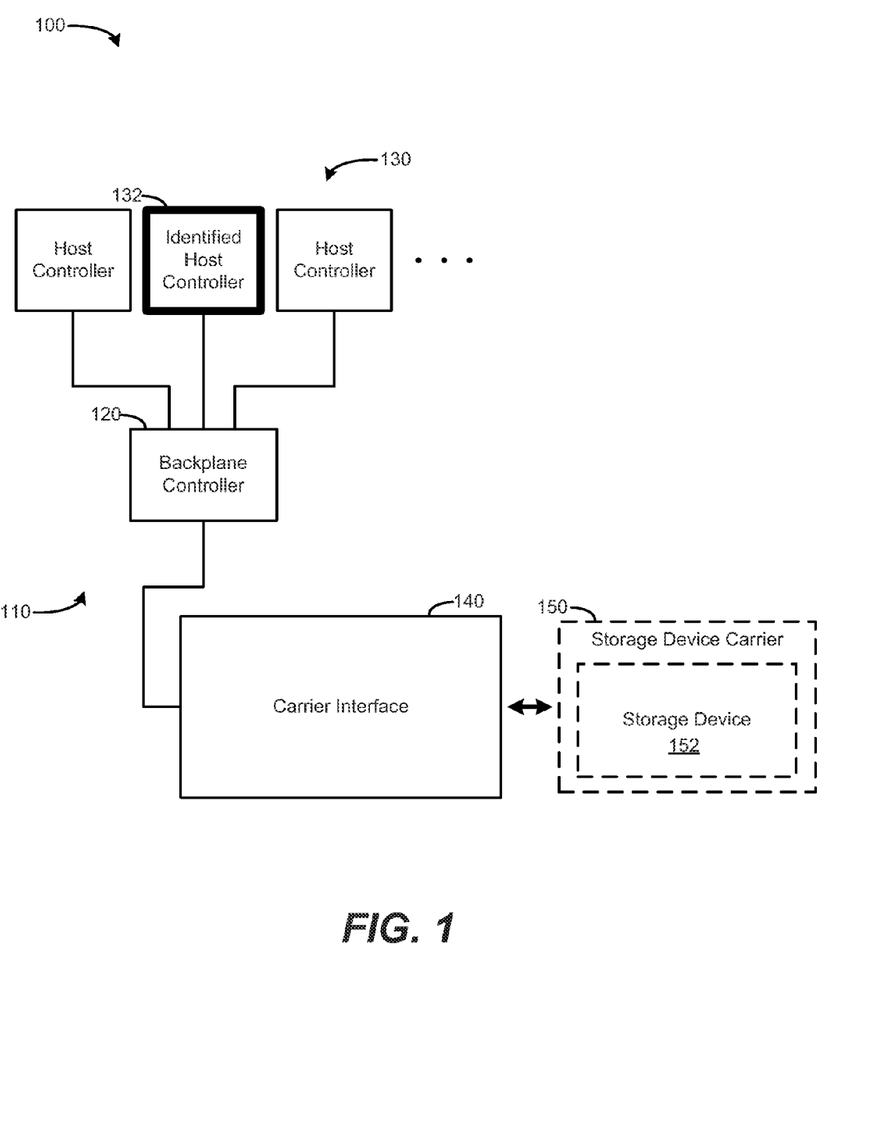
FIG. 1 is a block diagram of a system including a backplane controller according to an example.

FIG. 1 is a block diagram of a system 100 including a backplane controller 120 according to an example. The backplane controller 120 is associated with backplane 110 and to couple to a plurality of host controllers 130 and a carrier interface 140. The carrier interface 140 is to receive a storage device carrier 150 including a storage device 152. The backplane controller 120 is to arbitrate multiplexing of communication between the carrier interface 140 and the identified host controller 132 corresponding to the type of the storage device 152.

The backplane controller 120 may be used to arbitrate multiplexing of communication for a plurality of host controllers 130. In an example, a host controller 130 may be an inter-integrated circuit (I2C) master device, and may manage general-purpose input/outputs (GPIOs) to interface the different types of storage devices. The backplane controller 120 may be a complex programmable logic device (CPLD), a programmable array logic (PAL) device, a field-programmable gate array (FPGA) device, a programmable system on a chip (PSOC) device, or other general-purpose device that is customized to provide the desired functionality, including a general integrated circuit (IC). The backplane controller 120 may be a programmable controller that may be updated based on a downloadable software update to program the functionality of the backplane controller 120.

Reference numeral 110 is shown merely for reference to generally indicate where a backplane could be located relative to the backplane controller 120. However, the backplane controller 120 may be used in a system that does not include a backplane 110. For example, the backplane controller 120 may be located internally in and/or incorporated into one or more of various component(s) of a system to interact with a storage device carrier 150.

The host controllers 130 may include various controllers to interface with a storage device 152. For example, host controllers 130 may include controllers for a SAS redundant array of independent disks (RAID), a "master" circuit/FPGA (e.g., that resides in a PCI express add-in card and is controlled by a SCSI express software driver), a PCI express "inband" I2C master of a storage device 152, and other future storage device controller implementations to interface with the carrier interface 140 and future storage devices 152.

The carrier interface 140 may be based on a small form factor (SFF) connector, such as an SFF-8639 drive connector to physically interface with a SAS, SATA, external SATA (eSATA), PCI express, SCSI express, or other format storage device. The carrier interface 140 may be formed to enable interfacing with a universal storage device carrier 150, regardless of type of carrier/drive. Thus, any type of storage device 152 may be received by the carrier interface 140 and controlled by a corresponding one of the plurality of host controllers 130 via the backplane controller 120, whether a SAS controller, eSATA controller, SCSI express controller, and so on. The storage device 152 may include magnetic memory devices such as a hard disk, floppy disk, and/or tape memory, a solid state drive ("SSD"), flash memory, phase change memory, and so on.

The storage device carrier 150 (e.g., a drive tray) is to mount the storage device 152, to enable that assembly of the storage device 152 and storage device carrier 150 to be removably coupled with the carrier interface 140. The storage device carrier 150 may be a smart carrier, to provide authentication services to authenticate the storage device 152 as a legitimate/accepted component acceptable to be interfaced with the system 100, while denying counterfeit storage devices. The carrier 150 also enables various different technologies (including future technologies) to be used, based on enabling different types of storage devices 152 to be arranged as an assembly with the carrier 150 that is universally accepted at the carrier interface 140. As an example, the common carrier approach of FIG. 1 enables a SAS storage device 152 and carrier 150 to be pulled out from the carrier interface 140, and replaced with a SCSI express storage device 152 and associated carrier 150 (or other type of storage device 152).

The carrier 150 may include its own indicators, such as a light emitting diode (LED), and push-button or other input features, that are operable independent of or in conjunction with any indicators and/or inputs on a particular type of storage device 152. Thus, the carrier 150 enables the system 100 to provide standardized indicators and inputs at the carrier 150, even when using various different types of storage devices 152, and even for those storage devices that are not typically associated with such indicators and/or inputs/outputs. For example, a hard drive may not include an activity indicator or a hot-plug removal input, but the carrier 150 may provide such features when using that hard drive with system 100. The carrier 150 does not need to have any knowledge of what type of storage device 152 is attached to the carrier 150, because the backplane controller 120 is to arrange for a corresponding identified host controller 132 (e.g., a master I2C host) to communicate with the storage device 152 and control the various indicators/inputs of the carrier 150 to affect a status of the storage device 152. Thus, the carrier 150 may be universal in that it may operate without a need to know what particular type of storage device 152 it is coupled with. The carrier 150 and storage device 152 may be mated at a factory and not meant to be separated by an end user. Different types of storage devices 152 may each be mated to their corresponding carriers 150 to accommodate that type of storage device 152. Thus, swapping between different types of storage devices 152 may be as straightforward as pulling out a first type of storage device carrier 150, and putting in a second type at the carrier interface 140 (e.g., at one of a plurality of drive bays).

The backplane controller 120 may identify, on-the-fly, the type of storage device 152 being inserted to the carrier interface 140, and switch arbitration of the multiplexing on-the-fly upon swapping the storage devices (or preserve the existing arbitration of multiplexing if the swapped storage device is the same type). Thus, backplane controller 120 enables hot-plugging and hot-removal of storage devices 152 to/from system 100, even for types of storage devices 152 that do not natively support such features on their own. The backplane controller 120 may dynamically identify and/or determine what type of storage device 152 and/or carrier 150 is plugged in to the carrier interface 140 (e.g., inserted into one of a plurality of drive bays of the backplane), and establish arbitration of the multiplexing so that the correctly identified host controller 132 corresponding to the storage device 152 is communicating with the storage device 152. The backplane controller 120 may identify information from the carrier 150, as well as information from the storage device 152, to identify the type of storage device 152. Additionally, the backplane controller 120 may query the storage device 152 to determine whether the storage device 152 itself may master a communication channel (e.g., master the I2C bus itself).

Figure 2:
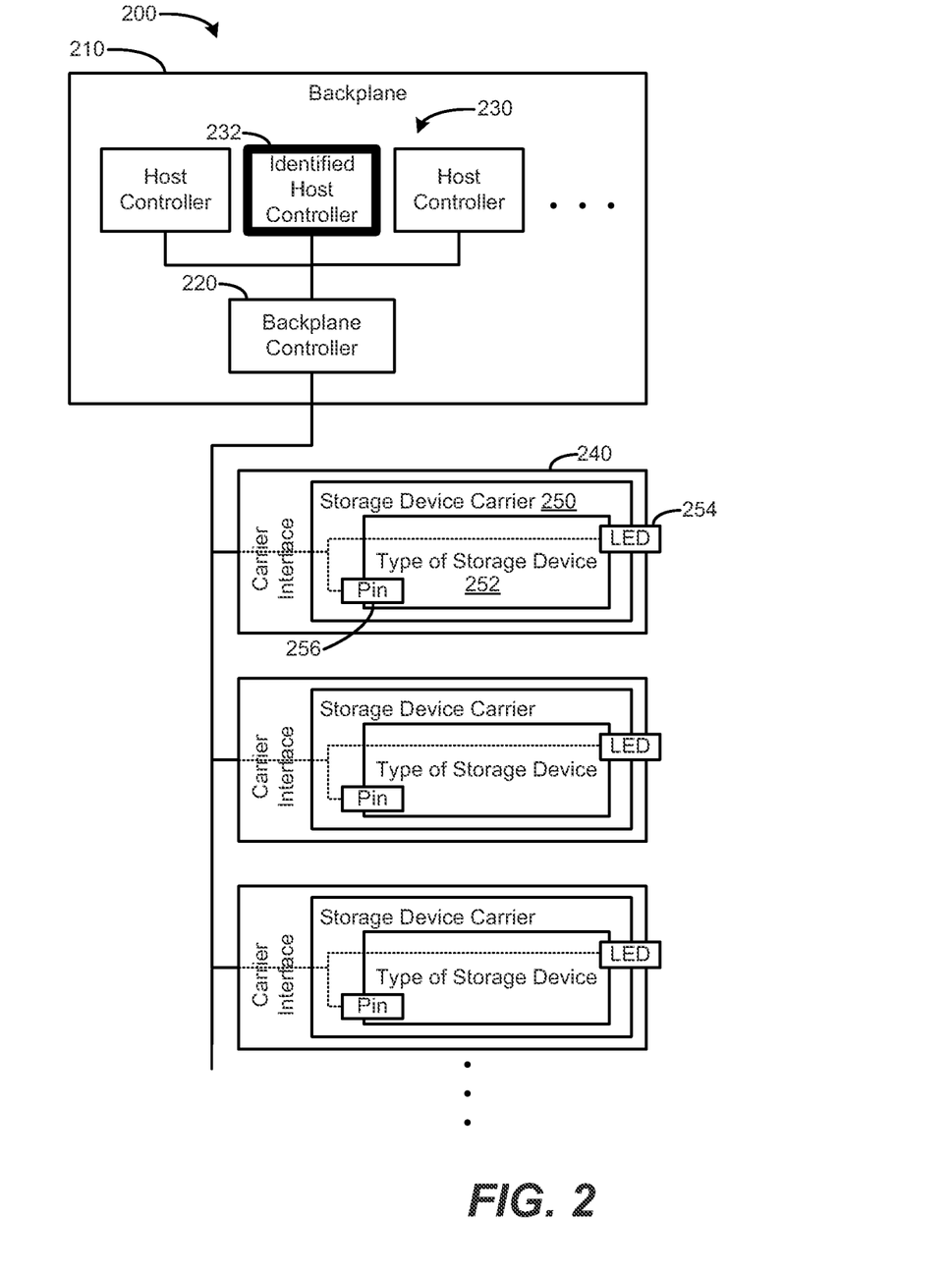
FIG. 2 is a block diagram of a system including a backplane controller according to an example.

FIG. 2 is a block diagram of a system 200 including a backplane controller 220 according to an example. The backplane controller 220 is associated with backplane 210 and to couple to a plurality of host controllers 230 and a plurality of carrier interfaces 240. A carrier interface 240 is to receive a storage device carrier 250 including a type of storage device 252. The storage device 252 may include one or more indicator(s) 254, such as a light emitting device (LED), and one or more pin(s) 256. The backplane controller 220 is to arbitrate multiplexing of communication between an identified host controller 232 and the plurality of carrier interfaces 240 (e.g., based on a one-to-many, many-to-many, and/or many-to-one multiplexing between the plurality of host controllers 230 and the plurality of storage devices 252).

The backplane controller 220 is shown located in the backplane 210. Multiple storage device carriers 240 may interface with the same backplane, and may be controlled by the same backplane controller 220 based on its multi-functionality for interfacing. For example, the backplane controller 220 located in the backplane 210 may provide SCSI express backplane support to the backplane 210.

The controllers 220, 230 may provide root complex functionality. Additionally, the backplane controller 220 may interface with an option card(s), that acts as a root complex for storage devices 252 downstream of the option card. An on-board power supply may be included in the backplane 210 to supply power to the backplane controller 220, according to the number of backplane controllers 220 and storage devices 252 supported. For example, one backplane controller 220 may be used to support two storage devices 252, three backplane controllers 220 may be cascaded together to support six storage devices 252, and so on, with corresponding variations in power characteristics. Additional combinations and/or expansions are possible, depending on the number of storage devices 252 to be supported and other factors.

The storage device 252 may include at least one pin 256, that may be used to identify the type of storage device 252. The pin 256 may be read by the backplane controller 220 to identify the type of storage device 252, and enable the backplane controller 220 to identify which indicators 254 may be controlled on the storage device 252. By identifying the type of storage device connected in a given carrier interface 240 (hard drive bay), the backplane controller 220 may arbitrate multiplexing accordingly so that the correct one of the plurality of upstream host controllers 230 is identified (232) and communicating with the storage device 252. Further, the backplane controller 220 can pass on information to the identified host controller 232 regarding what indicators 254 or other inputs/outputs may be handled by the identified host controller 232.

The indicator 254 may be a light emitting diode (LED) or other type of indicator. The indicator 254 may be controlled by the identified host controller 232, and/or the backplane controller 220, to communicate information regarding the storage device 252. In an example, the indicator 254 may include amber/blue/green LED colors that may be solid or blinking. For example, the LED may be illuminated amber to serve as an error indicator (if solid), or blinking as a predictive error indicator. The blue LED may be illuminated to serve as a locator, to indicate which of a plurality of hard drive storage devices 252 in a rack are to be serviced, and where located in the rack. A green LED may be illuminated to represent activity. Thus, the backplane controller 220 enables consistent usage of indicators 254 system-wide, regardless of a type of storage device 252 and corresponding identified host controller 232, enabling improved usability with systems 200 relying on a mixed plurality of different types of storage devices 252.

Figure 3:
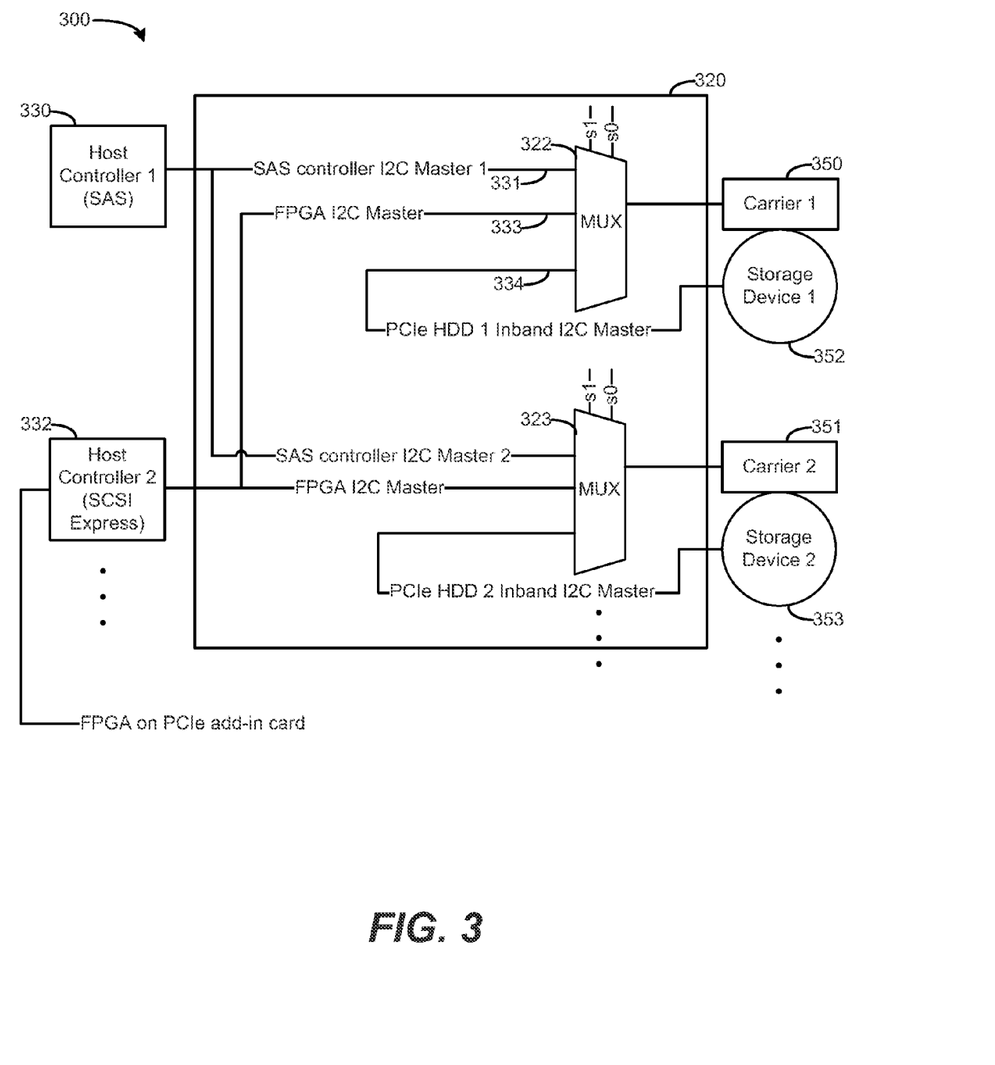
FIG. 3 is a block diagram of a system including a backplane controller according to an example.

FIG. 3 is a block diagram of a system 300 including a backplane controller 320 according to an example. The backplane controller 320 includes a plurality of MUXes 322, 323 to arbitrate multiplexing between a plurality of host controllers 330, 332, carriers 350, 351, and storage devices 352, 353. A MUX may interface with a first path 331, second path 333, and third path 334.

System 300 enables, based on the backplane controller 320, dynamically resetting and setting up the MUXes 322, 323 on-the-fly. Accordingly, a first carrier 350, which may happen to include a SAS drive, may be pulled out of its carrier bay, and a replacement SCSI express drive may be inserted into the same carrier bay. The backplane controller 320 can dynamically detect that change in types of storage devices 352, and flip the arbitration of the multiplexing of paths seamlessly, on-the-fly, without a need to power-down or otherwise impede the operation of the system 300. System 300 also enables hot-plugging, hot-adding, and other commands, including communication of a PCI express signal or other signal between a storage device and corresponding host controller via the backplane controller 320, without diminishing the available commands supported by a given host controller, even if not the most widely adopted features.

The backplane controller 320 may interface with the carriers 350, 351 and storage devices 352, 353 based on standard connectors (e.g., to interface storage devices based on SAS/SATA/PCIe or other interfaces). For example, SFF-8639 connectors may be used to interface the carriers 350, 351 to corresponding bays/interfaces associated with the backplane controller 320. The host controllers 330, 332 similarly may use standard connectors, such as SFF-8087 connectors to interface with a system/drive interface.

The MUXes 322, 323 may be provided as two 3-to-1 I2C MUXes. Each MUX is to select one among three paths to output to the carriers 350, 351, such as selecting among input I2C buses 331, 333, 334. The MUXes 322, 323 do not need to snoop or process the transactions between the host controllers 330, 332 and the storage devices 352, 353, although the backplane controller 320 may identify aspects of communications as appropriate. In an example bi-directional implementation, backplane controller 320 may snoop for read and write commands to determine a direction of a transaction, or whether a transaction is targeted at the backplane controller 320 itself. Communications may be targeted at the backplane controller 320, e.g., by being sent through an I2C slave address x40 or other specific path/destination.

Accordingly, the backplane controller 320 enables support for multiple past, current, and future technologies to be used simultaneously and interchangeably. Systems 300 based on the backplane controller 320 do not need to burden themselves with having multiple incompatible types of interfaces/bays for the various different types of storage device interfaces and related technologies that are supported.

Figure 4:
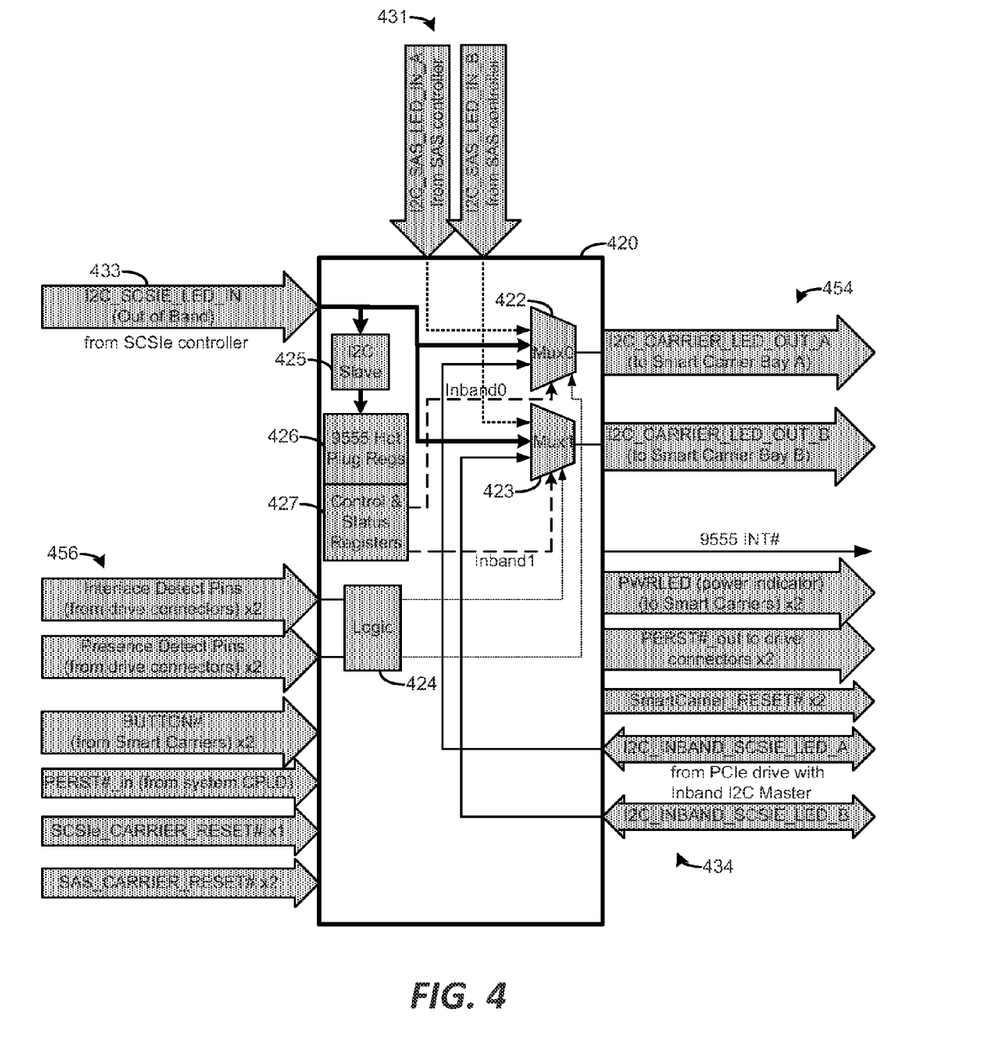
FIG. 4 is a block diagram of a backplane controller including multiplexers according to an example.

FIG. 4 is a block diagram of a backplane controller 420 including multiplexers 422, 423 according to an example. MUXes 422, 423 are to arbitrate multiplexing between host controllers and storage device carriers based on a first path 431, second path 433, and third path 434. Although three paths are shown for convenience, the backplane controller 420 may support any number of different paths (e.g., based on using additional or fewer MUXes). The backplane controller 420 also includes slave 425, hot plug registers 426, control and status registers 427, and logic 424. Logic 424 is to couple the signals from pins 456 to the MUXes 422, 423. The control and status registers 427 are coupled to the MUXes 422, 423 based on paths Inband0 and Inband1. The MUXes 422, 423 are to output LED signals 454 for storage device carriers.

In an example, the second path 433 may be an out-of-band signal, such as from an LED/storage I2C, SCSIe controller, or the like. In an example, the second path 433 may be interfaced via a 68-pin connector to an LED I2C bus. Among other communications, the second path 433 may be used for communications directed at the backplane controller 420, via the slave 425, hot plug registers 426, and control and status registers 427.

The slave 425 may be, e.g., an out-of-band LED/storage I2C slave. The slave 425 may provide a vehicle for software to traverse, from another controller, to control GPIO, LEDs, resets and other features of a storage device carrier. The slave 425 may pass communications to various registers 426, 427, and others.

The hot plug registers 426 and control/status registers 427 may hold information about a storage device, which may be read by, e.g., driver software. The backplane controller 420 may be written to the registers 426/427 to specify that, e.g., an inband bus is a candidate selection for the MUXes 422, 423. A host controller that is to communicate with the backplane controller 420 may inform the backplane controller 420 via the registers 426/427 whether the host controller is to use an I2C master of the storage device itself. If so, the host controller may query a PCI express path as to whether an endpoint SCSI express drive can master its own I2C bus. If so, the host controller may communicate with the backplane controller 420 via I2C to have the backplane controller 420 arbitrate multiplexing (i.e., flip settings of the MUXes 422 and/or 423) in the direction to use the storage device's I2C master. The backplane controller 420 thus may receive an instruction, from a software device driver running on a host processor to arrange multiplexing to enable a storage device to itself master the I2C bus.

The hot plug registers 426 may be 9555 registers arranged in a beginning of x40 slave registers, and may behave according to an Intel® format where INT# will behave according to a specification for a 16-bit input/output (I/O) expander for I2C. In an example, one 9555 register set may be active. In a beginning of power up, a storage host may write a signature byte to one of the x40 control/status registers 427 to indicate its type of hotplug (HP) master, to identifying how to activate the correct set.

The control/status registers 427 may hold information relating to control and status of the MUXes 422, 423. In an example, inband capability may be determined via a software/driver upon power-up/hot-plug, and then a controller may write to an inband register in address x40, to flip a MUX so that the drive system management bus (SMBus) is connected to a storage device carrier.

The various communications paths 431, 433, 434 may correspond to various host controllers. The first path 431 may communicate with a SAS host controller. The second path 433 may communicate with a software driver (e.g., for a SCSIe storage host controller) to control LEDs, resets, and 9555 GPIOs. The third path 434 may communicate with a PCIe drive with an inband I2C master, and may be used for future types of interfacing. Currently, a SAS controller may serve as an LED controller, a SCSI express controller may serve as an LED controller, and in future interfaces, a storage device (hard drive) itself may serve as an LED controller. Thus, the third path 434 may provide a pass-through, passing communications from PCI express on to the I2C bus, looping back to the storage device itself.

The indicator signals 454 may use address range xD0-xDE for LED control (address depends on drive bay numbering), and be used to communicate with storage device carriers.

The pins 456 may include drive presence detect and interface detect signals. The signals from storage device interfaces, e.g., from the various pins of a storage device, may be monitored or otherwise checked by logic 424. Logic 424 may thereby identify which type of storage device carrier has been received at a carrier interface/drive bay, e.g., based on an interface detect pin and/or a presence detect pin, among others.

Signals from pins 456 may be interpreted (e.g., by logic 424), according to one or more pins. In an example, the presence detect (Presence) and interface detect (IfDet) signals may be monitored, such that logic 424 may identify a type of storage device according to the following combinations of Presence and IfDet. In this example, a value of zero (0) indicates that the signal is low, and a value of one (1) indicates that the signal is floating or high, although other values may be used depending on particular signaling implementations. For signals indicating {Presence, IfDet}=00, a SAS drive type may be identified. For signals indicating {Presence, IfDet}=10, a SCSIe drive type may be identified. For signals indicating {Presence, IfDet}=01, a Sata Express drive type may be identified. Signals indicating {Presence, IfDet}=11, may indicate that a drive is not present, i.e., the drive bay is vacant. The foregoing is one of many possible examples, and other voltage levels and/or combinations may be used. For example, a single pin or more than two pins may be used to identify information regarding the storage device type, and other techniques (e.g., non-pin-based, such as optical, radio frequency, magnetic, etc.) may be used to identify the type of storage device.

The backplane controller 420 also may interface with other input and/or output signals and/or communications. FIG. 4 illustrates the signal PERST#_in, which may relate to a PCIe global reset from a root port. PERST#_out may relate to a PCIe device reset to drive connectors. BUTTON# may relate to an attention button corresponding to a storage device carrier peripheral interface controller (PIC) for orderly hot removal. Upon a PCIe drive hot insertion, the backplane controller 420 may imitate a button push for, e.g., 1 second, using a 9555 BUTTON# register and assert an INT#. The backplane controller 420 thus may avoid issues that would be associated with a storage device carrier's PIC having no ability to tell the difference between power up or whether a system is coming out of a reset condition. The signal and/or communication SCSIe_CARRIER_RESET# may include a smart carrier reset# signal from a SCSIe host. SAS_CARRIER_RESET# may include a smart carrier reset# signal from a SAS host. PWRLED is a power LED signal to a storage device carrier PIC for supporting orderly hot-removal. A storage device carrier reset assertion can power cycle a 5 V rail going to the carrier, which may be used to reset a stuck I2C bus. This reset may originate from the backplane controller 420 or from a SAS controller. Depending on a storage device type, the backplane controller 420 may pass through or block a carrier Reset_N signal from a SAS controller. The RESET# for an express bay may be kept separate from other SAS-only bays, which may result in use of a separate/dedicated current limiting power switch for each SCSI Express slot.

In an example, when a SAS/SATA type of storage device is inserted to a connector (e.g., SFF-8639) of a carrier interface/drive bay, a signal called IfDet (interface detect) may remain high. The backplane controller 420, which senses the IfDet signal, may enable the SAS RAID Controller I2C path (i.e., first path 431). When a PCIe type of storage device is inserted, the IfDet signal may be pulled low. The backplane controller 420 may first enable a FPGA I2C channel (i.e., second path 433). A SCSI express operating system (OS) software driver may inquire the storage device as to whether or not the storage device supports "inband" I2C master. If the storage device does not have inband I2C support, the FPGA I2C path will still be selected. But if the PCIe storage device supports inband I2C master, the SCSI Express driver may drive the FPGA to write into an inner register (i.e., registers 426/427) of the backplane controller 420, so that the backplane controller 420 will enable the storage device's inband I2C channel into the storage device carrier drive tray. The backplance controller 420 may use other signals when storage devices are inserted, e.g., combinations of signals such as IfDet, Presence Detect, and/or others, either alone or in combination, for determining a type of storage device.

The backplane controller 420 thus may serve as a slave device (e.g., via slave 425) to the SCSI Express FPGA for GPIO functions. The backplane controller 420 may monitor the drive presence status and removal request (pins 456 and/or logic 424), and report any events to the FPGA via an interrupt signal. The FPGA may then issue I2C cycles to the backplane controller 420 to check status and control resets and other GPIOs.

Figure 5:
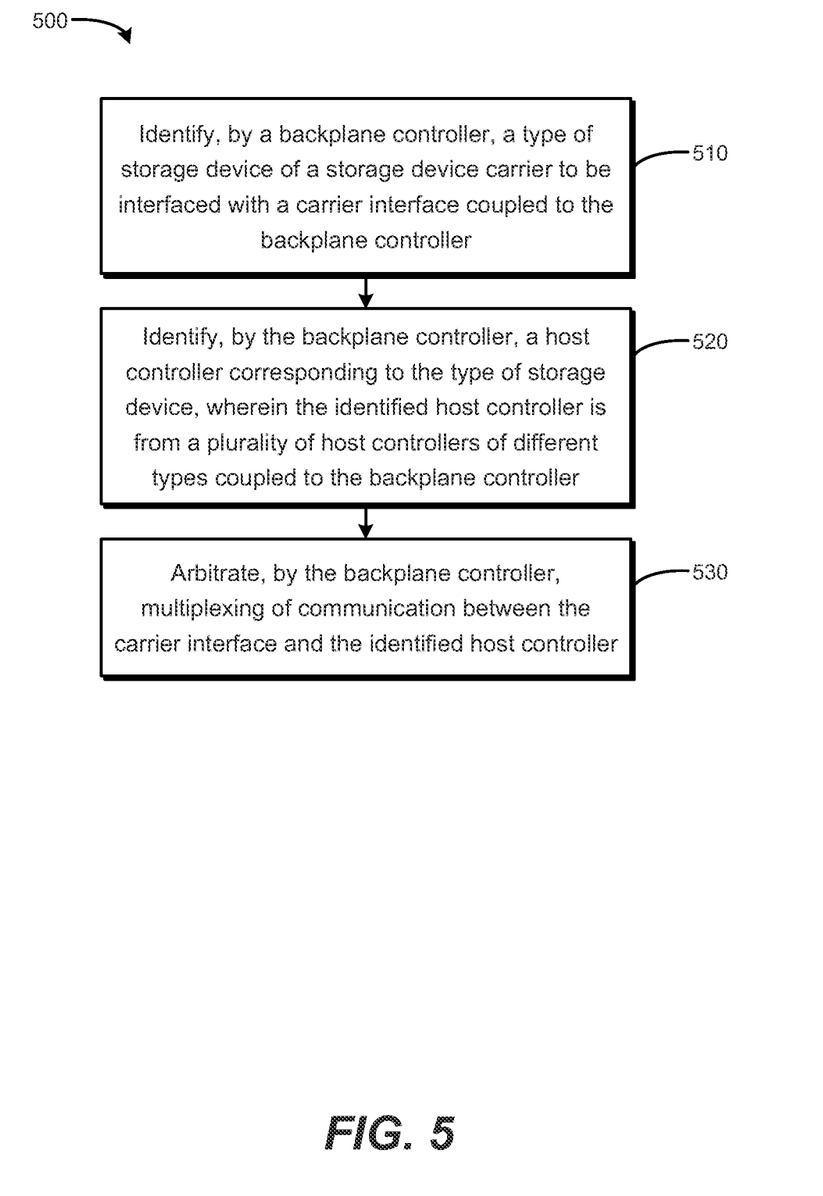
FIG. 5 is a flow chart based on arbitrating multiplexing according to an example.
Figure 6:
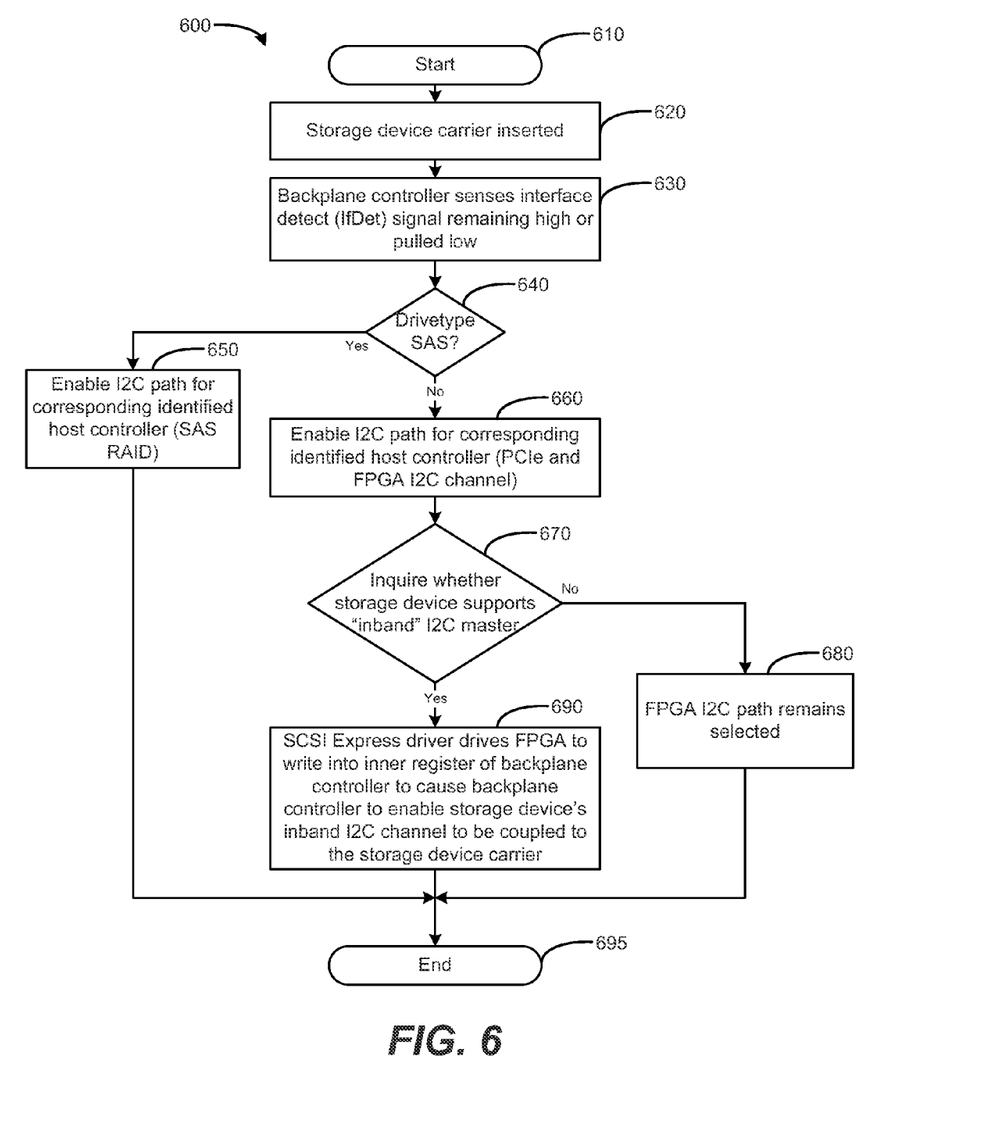
FIG. 6 is a flow chart based on enabling I2C paths according to an example.

Referring to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 5 is a flow chart 500 based on arbitrating multiplexing according to an example. In block 510, a backplane controller is to identify a type of storage device of a storage device carrier to be interfaced with a carrier interface coupled to the backplane controller. In an example, the backplane controller may identify the type on-the-fly dynamically, without a need to pre-prepare the system prior to insertion of the storage device into the drive bay/carrier interface. In block 520, the backplane controller is to identify a host controller corresponding to the type of storage device, wherein the identified host controller is from a plurality of host controllers of different types coupled to the backplane controller. In an example, the host controller may be contained in the storage device itself. In block 530, the backplane controller is to arbitrate multiplexing of communication between the carrier interface and the identified host controller. In an example, the backplane controller may flip the configuration of the multiplexing based on a plurality of multiplexers that may be cascaded. Arbitration may be on-the-fly to dynamically establish communication paths between the type of storage device and corresponding host controller, regardless of the particular types.

FIG. 6 is a flow chart 600 based on enabling paths according to an example. Flow starts at block 610. In block 620, insertion of a storage device is identified. For example, a carrier is inserted, along with a storage device that is coupled to the carrier. The carrier may enable various different types of storage devices to couple with a system, based on a uniform connector associated with the carrier. In block 630, the backplane controller senses an interface detect (IfDet) signal remaining high or being pulled low. For example, insertion of a SAS/SATA storage device type may affect a value of IfDet, or other signals such as presence detect, resulting in the ability to determine whether a type of storage device is present based on the signal values. In block 640, it is determined whether a SAS storage device is detected. If drive type is SAS, flow proceeds to block 650. In block 650, an I2C path for a corresponding identified host controller (SAS RAID) is enabled, and flow proceeds to end.

If, at block 640, it is determined that drive type is not SAS, flow proceeds to block 660. In block 660, an I2C path for a corresponding identified host controller (PCIe and FPGA I2C channel) is enabled. In block 670, it is determined whether the storage device supports an "inband" I2C master. If not, flow proceeds to block 680. In block 680, an FPGA I2C path remains selected, and flow proceeds to end. If, at block 670, it is determined that the storage device supports inband I2C master, flow proceeds to block 690. In block 690, a SCSI Express driver drives an FPGA to write into an inner register of the backplane controller to cause the backplane controller to enable the storage device's inband I2C channel to be coupled to the storage device carrier. Flow ends at block 695.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor (such as a backplane controller) can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system comprising:
    a backplane controller to couple to a carrier interface and a plurality of host controllers of different types, and to identify a host controller corresponding to a type of a storage device of a storage device carrier to interface with the carrier interface;
    wherein the backplane controller is to arbitrate multiplexing of communication between the carrier interface and the identified host controller; and
    wherein the carrier interface is physically removably coupleable with a universal storage device carrier that the carrier interface is to universally accept, such that a first type of storage device, controllable by a corresponding first one of the plurality of host controllers, can be removed and replaced via carrier at the carrier interface with a storage device of a second type, controllable by a corresponding second one of plurality of host controllers, based on arbitration by the backplane controller.

2. The system of claim 1, wherein the backplane controller is to couple to the plurality of host controllers and the carrier interface via an I2C bus.

3. The system of claim 1, wherein the backplane controller is to pass communications between the identified host controller and the carrier interface regardless of host controller type and storage device type, wherein the communications include reset, hot-plug, and hot-removal instructions.

4. The system of claim 1, wherein the backplane controller is to enable hot-plug and hot-removal functionality for storage device carriers that are based on a Peripheral Component Interconnect Express (PCIe) interface.

5. The system of claim 1, wherein the backplane controller is to operate an indicator of the storage device earlier to indicate an operational status of the storage device, regardless of host controller type and storage device type.

6. The system of claim 5, wherein the backplane controller is to couple with an I2C inband of a drive connector of the storage device carrier, to control an indicator controller of the storage device.

7. The system of claim 1, wherein the backplane controller is a complex programmable logic device (CPLD), the plurality of host controllers are I2C master devices, and the backplane controller is to interface different types of storage devices based on general purpose input/output (GPIO) management.

8. The system of claim 1, wherein the plurality of host controllers includes a serial attached small computer system interface (SCSI) redundant array of independent disks (SAS RAID) controller, a SCSI express controller, and a PCIe storage device inband I2C master controller.

9. The system of claim 1, wherein the backplane controller is to simultaneously interface with a plurality of storage device carriers.

10. The system of claim 1, wherein the backplane controller is to identify the type of the storage device based on querying a storage device pin.

11. The system of claim 1, wherein the backplane controller is to enable a controller path based on sensing an interface detect signal and a presence detect signal.

12. The system of claim 1, wherein the backplane controller is to serve as a slave device to a SCSI express host controller to provide GPIO functions, to report events to the SCSI express host controller via an interrupt signal and receive commands from the SCSI express host controller via I2C.

13. The system of claim 1, wherein the backplane controller is coupled via an I2C bus, and is to arbitrate imiltiplexing, in response to an instruction, to enable the storage device to itself master the I2C bus.

14. A system comprising:
    a backplane including a plurality of host controllers of different types to control storage devices of corresponding different types, wherein the backplane is to couple to a storage device of a storage device carrier based on a carrier interface coupled to the backplane; and
    a backplane controller coupled to the plurality of host controllers and the carrier interface, to identify a host controller corresponding to a type of the storage device, and arbitrate multiplexing of communication between the carrier interface and the identified host controller;
    wherein the carrier interface is physically removably coupleable with a universal storage device carrier that the carrier interface is to universally accept, such that a first type of storage device, controllable by a corresponding first one of the plurality of host controllers, can be removed and replaced via carrier at the carrier interface with a storage device of a second type, controllable by a corresponding second one of the plurality of host controllers, based on arbitration by the backplane controller.

15. A method, comprising:
    identifying, by a backplane controller, a type of storage device of a storage device carrier to be interfaced with a carrier interface coupled to the backplane controller;
    identifying, by the backplane controller, a host controller corresponding to the type of storage device, wherein the identified host controller is from a plurality of host controllers of different types coupled to the backplane controller; and arbitrating, by the backplane controller, multiplexing of communication between the carrier interface and the identified host controller;

wherein the carrier interface is physically removably coupleable with a universal storage device carrier that the carrier interface is to universally accept, such that a first type of storage device, controllable by a corresponding first one of the plurality of host controllers, can be removed and replaced via carrier at the carrier interface with a storage device of a second type, controllable by a corresponding second one of the plurality of host controllers, based on arbitration by the backplane controller.

* * * * *